United States Patent
Davey et al.

(10) Patent No.: US 7,481,915 B2
(45) Date of Patent: Jan. 27, 2009

(54) EXHAUST GAS TEMPERATURE MEASUREMENT UTILIZING AN EXHAUST GAS SENSOR

(75) Inventors: Christopher K. Davey, Novi, MI (US); David Robert Nader, Farmington Hills, MI (US); Kenneth John Behr, Farmington Hills, MI (US); Michael Igor Kluzner, Oak Park, MI (US); Michael James Uhrich, West Bloomfield, MI (US); Robert Joseph Jerger, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 788 days.

(21) Appl. No.: 10/661,757

(22) Filed: Sep. 12, 2003

(65) Prior Publication Data
US 2004/0050693 A1 Mar. 18, 2004

Related U.S. Application Data

(63) Continuation-in-part of application No. 09/779,814, filed on Feb. 8, 2001, now abandoned.

(51) Int. Cl.
*G01N 27/407* (2006.01)
*G01K 7/16* (2006.01)
(52) U.S. Cl. .................. 205/785; 204/424; 73/23.32; 374/142; 374/144
(58) Field of Classification Search ............... 205/784.5, 205/785; 204/424; 73/23.32; 374/142, 144
See application file for complete search history.

(56) References Cited

U.S. PATENT DOCUMENTS

| | | | |
|---|---|---|---|
| 4,524,264 A * | 6/1985 | Takeuchi et al. | ............ 219/497 |
| 4,958,611 A | 9/1990 | Uchinami et al. | |
| 5,245,979 A | 9/1993 | Pursifull et al. | |
| 5,428,956 A | 7/1995 | Maus et al. | |
| 5,431,012 A | 7/1995 | Narula et al. | |
| 5,592,815 A | 1/1997 | Jelden et al. | |
| 5,626,014 A | 5/1997 | Hepburn et al. | |
| 5,630,315 A | 5/1997 | Theis | |
| 5,706,652 A | 1/1998 | Sultan | |
| 5,713,198 A | 2/1998 | Aoki et al. | |
| 5,740,675 A * | 4/1998 | Shimasaki et al. | ............ 60/274 |
| 5,752,382 A | 5/1998 | Hanafusa et al. | |
| 5,860,277 A | 1/1999 | Schnaibel et al. | |
| 5,929,328 A | 7/1999 | Seidenfuss | |
| 5,938,715 A | 8/1999 | Zhang et al. | |
| 6,164,125 A | 12/2000 | Kawase et al. | |
| 6,287,453 B1 | 9/2001 | Rösel et al. | |
| 6,432,287 B1 * | 8/2002 | McMackin et al. | .......... 204/424 |
| 6,964,194 B2 | 11/2005 | Busch et al. | |

* cited by examiner

*Primary Examiner*—Kaj K Olsen
(74) *Attorney, Agent, or Firm*—Allan J. Lippa; Alleman Hall McCoy Russell & Tuttle LLP

(57) ABSTRACT

A system for determining a temperature of exhaust gases from an engine is provided. The system includes an exhaust gas sensor having an electric heating coil. The sensor communicates with exhaust gases from the engine. The system further includes an electrical circuit for generating a signal indicative of the resistance of the heating coil when the coil is not energized. Finally, the system includes a controller receiving the signal and calculating the temperature of the exhaust gases based on the signal.

6 Claims, 3 Drawing Sheets

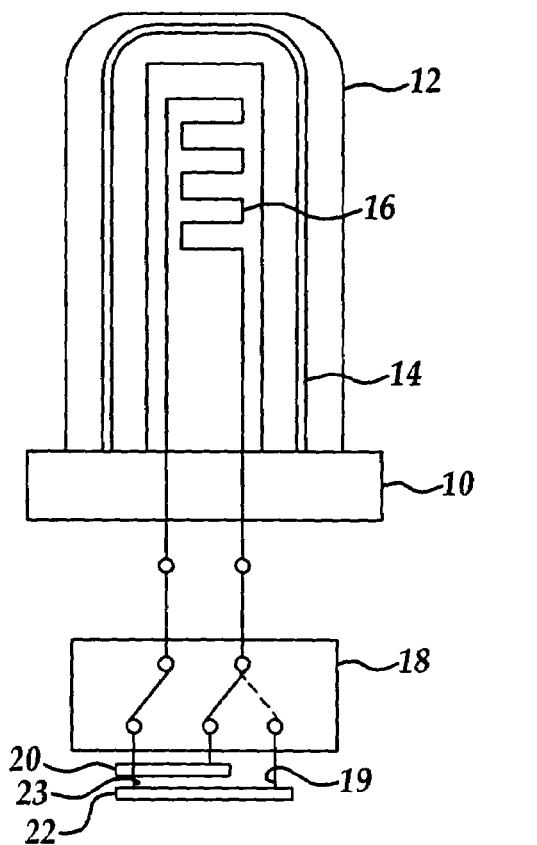
*Figure 1*
*Figure 1A*
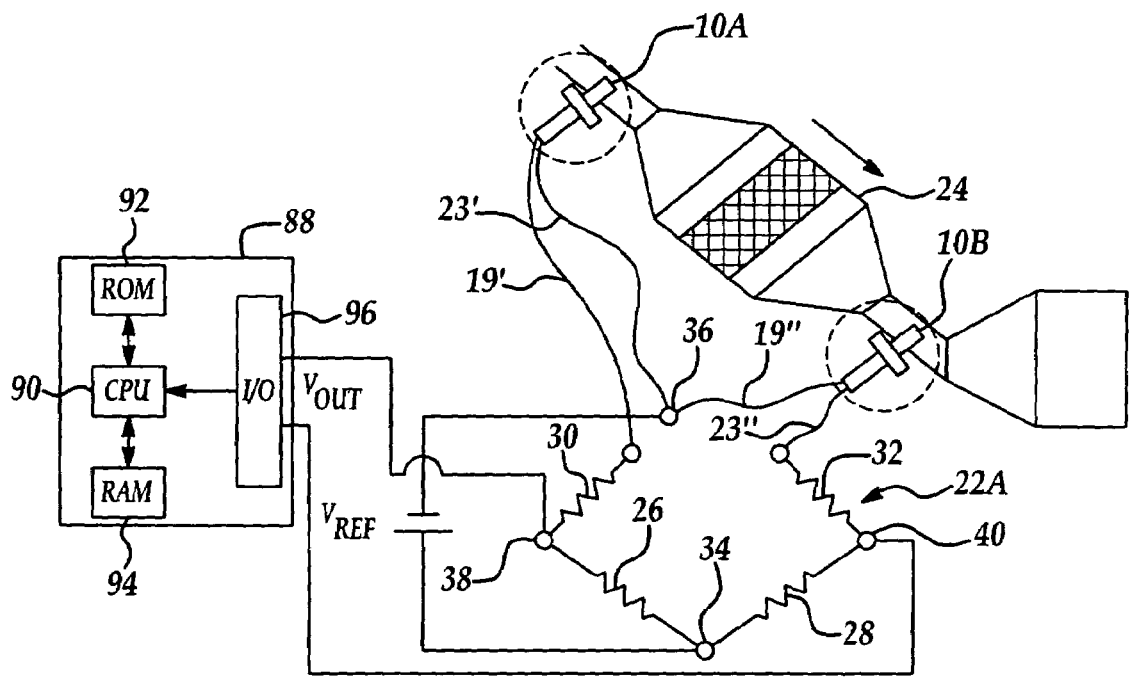
*Figure 2*

EXHAUST GAS TEMPERATURE MEASUREMENT UTILIZING AN EXHAUST GAS SENSOR

This application is a continuation-in-part of application Ser. No. 09/779,814, filed Feb. 8, 2001 now abandoned.

FIELD OF THE INVENTION

This invention relates to a system and method that utilizes an exhaust gas sensor to determine a temperature of exhaust gases in an engine exhaust system.

BACKGROUND INFORMATION

Known engine control systems have utilized conventional temperature sensors disposed in engine exhaust systems to measure exhaust gas temperatures. The temperature measurement of the exhaust gases can be utilized by an engine controller for various purposes including: (i) determining an operating efficiency of an emission catalyst, and (ii) determining when to purge an emission catalyst of stored exhaust gas constituents.

Known engine control system also utilize separate exhaust gas sensors, such as oxygen sensor for example, for controlling air-fuel delivery to the engine cylinders. Generally, a first exhaust gas sensor is disposed upstream of an emission catalyst and a second exhaust gas sensor is disposed downstream of the emission catalyst.

The inventors herein have recognized that it would be advantageous to measure exhaust gas temperatures with the exhaust gas sensors, thereby eliminating the need for a separate temperature sensors in vehicle exhaust systems.

SUMMARY OF THE INVENTION

A system for determining a temperature of exhaust gases from an engine in accordance with a first aspect of the present invention is provided. The system includes an exhaust gas sensor having an electric heating coil. The sensor communicates with exhaust gases from the engine. The system further includes an electrical circuit for generating a signal indicative of the resistance of the heating coil when the coil is not energized. Finally, the system includes a controller receiving the signal and calculating the temperature of the exhaust gases based on the signal.

A method for determining a temperature of exhaust gases from an engine in accordance with a second aspect of the present invention is provided. The method includes generating a signal indicative of a resistance of a heating coil in an exhaust gas sensor when the coil is not energized. Finally, the method includes calculating a temperature of the exhaust gases based on the signal.

A system for determining a temperature difference of exhaust gases from an engine in accordance with a third aspect of the present invention is provided. The engine is coupled to an emission catalyst. The system includes a first exhaust gas sensor having a first electric heating coil. The first sensor communicates with exhaust gases upstream of the catalyst. The system further includes a second exhaust gas sensor having a second electric heating coil. The second sensor communicates with exhaust gases downstream of the catalyst. The system further includes a first electrical circuit generating a first signal indicative of a resistance of the first heating coil when the first coil is not energized. The system further includes a second electrical circuit generating a second signal indicative of the resistance of the second heating coil when the second coil is not energized. Finally, the system includes a controller calculating a temperature difference between exhaust gases communicating with the first and second exhaust gas sensors based on the first and second signals.

A system for determining a temperature difference of exhaust gases from an engine in accordance with a fourth aspect of the present invention is provided. The engine is coupled to an emission catalyst. The system includes a first exhaust gas sensor having a first electric heating coil. The first sensor communicates with exhaust gases upstream of the catalyst. The system further includes a second exhaust gas sensor having a second electric heating coil. The second sensor communicates with exhaust gases downstream of the catalyst. The system further includes an electrical circuit generating a first signal based on both a resistance of the first sensor heating coil and a resistance of the second sensor heating coil. Finally, the system includes a controller calculating a temperature difference between exhaust gases communicating with the first and second exhaust gas sensors based on the first signal.

The inventive systems and method provides a substantial advantage over known systems and method. In particular, the systems and method utilizes a conventional exhaust gas sensor to measure a temperature of engine exhaust gases. Thus, a separate temperature sensor, as used in conventional exhaust systems, would not be needed. As a result, the inventive system has decreased component and manufacturing costs as compared with conventional systems.

BRIEF DESCRIPTION OF THE DRAWINGS

FIG. 1 is a schematic of an exhaust gas sensor utilized in the present invention.

FIG. 1A is signal diagram illustrating a voltage utilized to control a heating coil in the exhaust gas sensor of FIG. 1.

FIG. 2 is a schematic of a system for determining a temperature difference between exhaust gases at two separate sensor locations in accordance with a first embodiment of the present invention.

DESCRIPTION OF THE EMBODIMENTS

Figure 3:
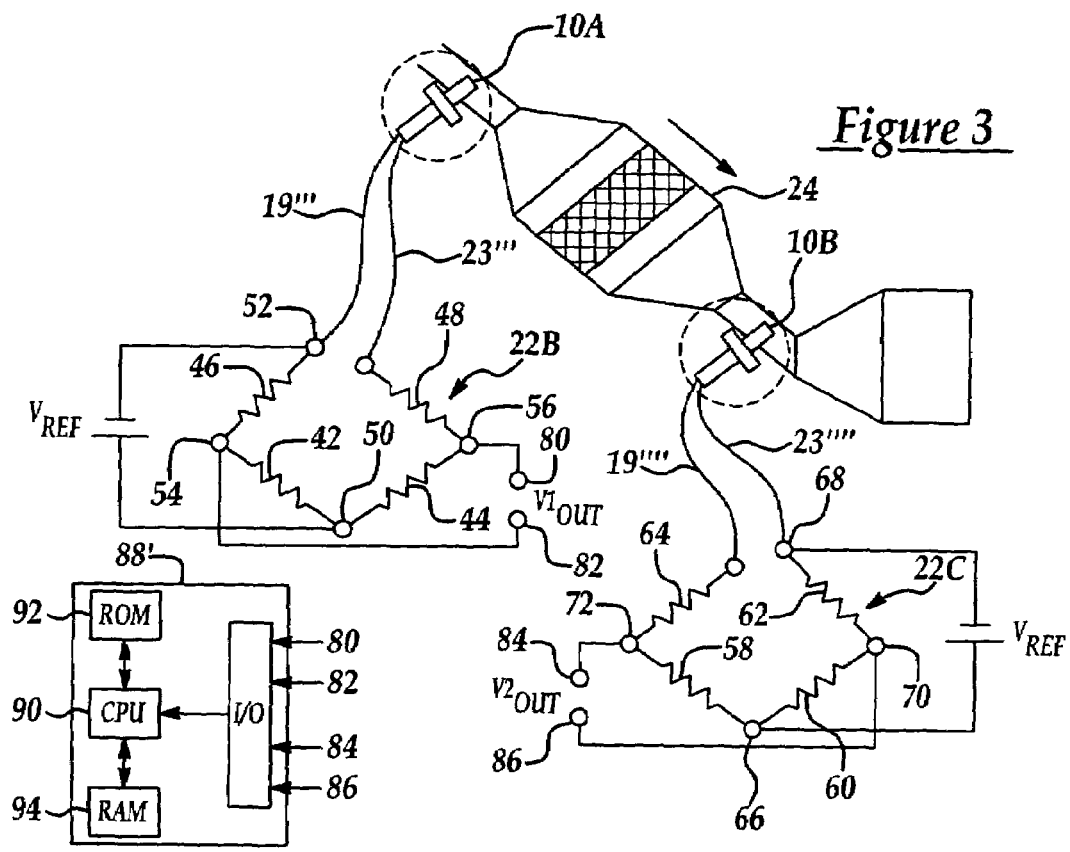
FIG. 3 is a schematic of a system for determining both an actual temperature of exhaust gases at a single sensor location and a temperature difference between exhaust gases at two separate sensor locations in accordance with a second embodiment of the present invention.

Referring to FIG. 1, an exhaust gas sensor 10 for sensing an exhaust gas constituent in an exhaust system coupled to an engine is illustrated. For example, sensor 10 may comprise an oxygen sensor that includes a body suitable for mounting in the exhaust system. In alternate embodiments (not shown), sensor 10 may comprise a NOx sensor, a hydrocarbon sensor, a CO sensor, a $CO_2$ sensor, or any other exhaust gas sensor having a heating coil.

As shown, sensor 10 includes a shroud 12 disposed over a sensing element 14. An electric resistance heater 16 is disposed in heat transfer relationship with sensing element 14. When proper conditions for its operation are present, sensing element 14 provides an output signal that is indicative of an exhaust gas constituent, such as oxygen, in the exhaust gases.

Heater 16 is connected to an electric switching circuit 18 that operates to turn heater 16 on (i.e., energized state) and off (i.e., de-energized state) by connecting and disconnecting heater 16 from an electric current source 20. When switching circuit 18 is in the condition shown by solid lines in FIG. 1, electric current can flow from source 20 to heat heater 16. Because sensor 10 is in heat transfer relationship to sensing element 14, heater 16 can heat sensing element 14 when the sensor 10 is below its desired operating temperature.

When sensing element 14 is not being heated by heater 16, an element of switching circuit 18 operates to the broken line position of FIG. 1 to disconnect heater 16 from current source 20. This disconnection from current source 20 places heater 16 in series with a resistance measuring circuit 22 utilizing conductors 19, 23. FIG. 1A is a waveform depicting duty cycle operation of the heater characterized by turning the electric current to the heater on and off. The heater resistance is measured during the off times of heater 16.

The heater 16 is constructed from a material, such as steel, that has a known relationship between a resistance of the material and the temperature of the material. In other words, the electric resistance of heater 16 is an indication of the heater temperature and further indicative of the temperature of exhaust gases communicating with heater 16.

Referring to FIG. 2, a schematic of a system in accordance with a first embodiment of the present invention is illustrated. In particular, the system can determine a temperature difference between exhaust gases at two separate sensor locations. The system includes a resistance measuring circuit 22 associated with two exhaust gas sensors 10A, 10B and a controller 88. As shown, sensor 10A is disposed in an engine exhaust system immediately upstream of a catalytic converter 24 through which exhaust gases pass for catalytic treatment before being exhausted to atmosphere. Sensor 10B is disposed in the exhaust system downstream of converter 24 before the exhaust gas is discharged to atmosphere.

The resistance measuring circuit comprises a Wheatstone bridge circuit 22A. Bridge circuit 22A comprises four legs. A first leg comprises a known electric resistance 26, and a second leg comprises a known electric resistance 28. A third leg comprises a known electric resistance 30 connected in series with heater 16 of sensor 10A when the switching circuit 18 associated with that sensor is not heating the associated heater 16. A fourth leg comprises a known electric resistance 32 connected in series with heater 16 of sensor 10B when the switching circuit 18 associated with that sensor is not heating the associated heater 16. As shown, a known D.C. voltage $V_{ref}$ is applied between a first pair of opposite nodes 34, 36 of bridge circuit 22A. An output voltage $V_{out}$ is generated between a second pair of opposite nodes 38, 40 of bridge circuit 22A. The voltage $V_{out}$ represents a measurement of the difference between the temperature of exhaust gases entering converter 24 and the temperature of exhaust gases exiting converter 24.

Controller 88 is operatively coupled to circuit 22A to calculate the temperature difference between exhaust gases at sensor 10A and sensor 10B. It should be noted that in an alternate embodiment of the present invention discussed below, controller 88 can calculate an actual temperature value of exhaust gases at a single exhaust gas sensor location. As shown, controller 88 includes a microprocessor 90 communicating with various computer-readable storage media. The computer readable storage media preferably include nonvolatile and volatile storage in a read-only memory (ROM) 92 and a random-access memory (RAM) 94. The computer readable media may be implemented using any of a number of known memory devices such as PROMs, EPROMs, EEPROMs, flash memory or any other electric, magnetic, optical or combination memory device capable of storing data. Microprocessor 90 communicates with circuit 22A via an input/output (I/O) interface 96. The voltage $V_{out}$ is received by I/O 96 and microprocessor 90 calculates the exhaust gas temperature difference based on voltage $V_{out}$. Microprocessor 90 can calculate the temperature difference utilizing a "look-up" table stored in ROM 92 of temperature difference values indexed by the voltage value $V_{out}$.

Referring to FIG. 3, a schematic of a system in accordance with a second embodiment of the present invention is illustrated. The system can determine: (i) an actual temperature of exhaust gases at a single sensor location and (ii) a temperature difference between exhaust gases at two separate sensor locations. The system includes two resistance measuring circuits 22, each associated with a respective sensor 10A, 10B. Each measuring circuit 22 comprises a respective Wheatstone bridge circuit 22B, 22C and a controller 88'.

Bridge circuit 22B comprises four legs. A first leg comprises a known electric resistance 42, a second leg comprises a known electric resistance 44, and a third leg comprises a known electric resistance 46. A fourth leg comprises a known electric resistance 48 connected in series with heater 16 of sensor 10A when the switching circuit 18 associated with that sensor is not heating the associated heater 16. A known D.C. voltage $V_{ref}$ is applied between a first pair of opposite nodes 50, 52, and an output voltage $V1_{out}$ is generated between a second pair of opposite nodes 54, 56. Voltage $V1_{out}$ represents a signal indicative of the resistance of coil 16 in sensor 10A and further indicative of the temperature of exhaust gases entering converter 24.

Because resistance of the respective heater 16 indicates exhaust gas temperature when the heater is disconnected from its current source, and because that resistance influences the output voltage of the respective bridge circuit, that output voltage serves as a measurement of the temperature of exhaust gas flow to which the respective sensor 10 is exposed.

Bridge circuit 22C comprises four legs. A first leg comprises a known electric resistance 58, a second leg comprises a known electric resistance 60, and a third leg comprises a known electric resistance 62. A fourth leg comprises a known electric resistance 64 connected in series with heater 16 of sensor 10B when the switching circuit 18 associated with that sensor is not heating the associated heater 16. A known D.C. voltage $V_{ref}$ is applied between a first pair of opposite nodes 66, 68, and an output voltage $V2_{out}$ is generated between a second pair of opposite nodes 70, 72. Voltage $V2_{out}$ represents a signal indicative of the resistance of coil 16 in sensor 10B and further indicative of the temperature of exhaust gases exiting converter 24.

As shown, controller 88' receives voltage $V1_{out}$ via conductors 80, 82 and voltage $V2_{out}$ via conductors 84, 86. Controller 88' can calculate the temperature of exhaust gases communicating with sensor 10A utilizing voltage $V1_{out}$. In particular, microprocessor 90 can calculate the temperature of exhaust gases communicating with sensor 10A by utilizing a first "look-up" table stored in ROM 92 of temperature values. The first "look-up" table can indexed by the voltage value $V1_{out}$. Similarly, controller 88' can calculate the temperature of exhaust gases communicating with sensor 10B utilizing voltage $V2_{out}$. In particular, microprocessor 90 can calculate the exhaust gas temperature at sensor 10B by utilizing a second "look-up" table of temperature values indexed by the voltage value $V2_{out}$. Further, controller 88' can calculate a temperature difference between exhaust gases communicating with sensors 10A, 10B utilizing voltages $V1_{out}$ and $V2_{out}$.

Figure 4:
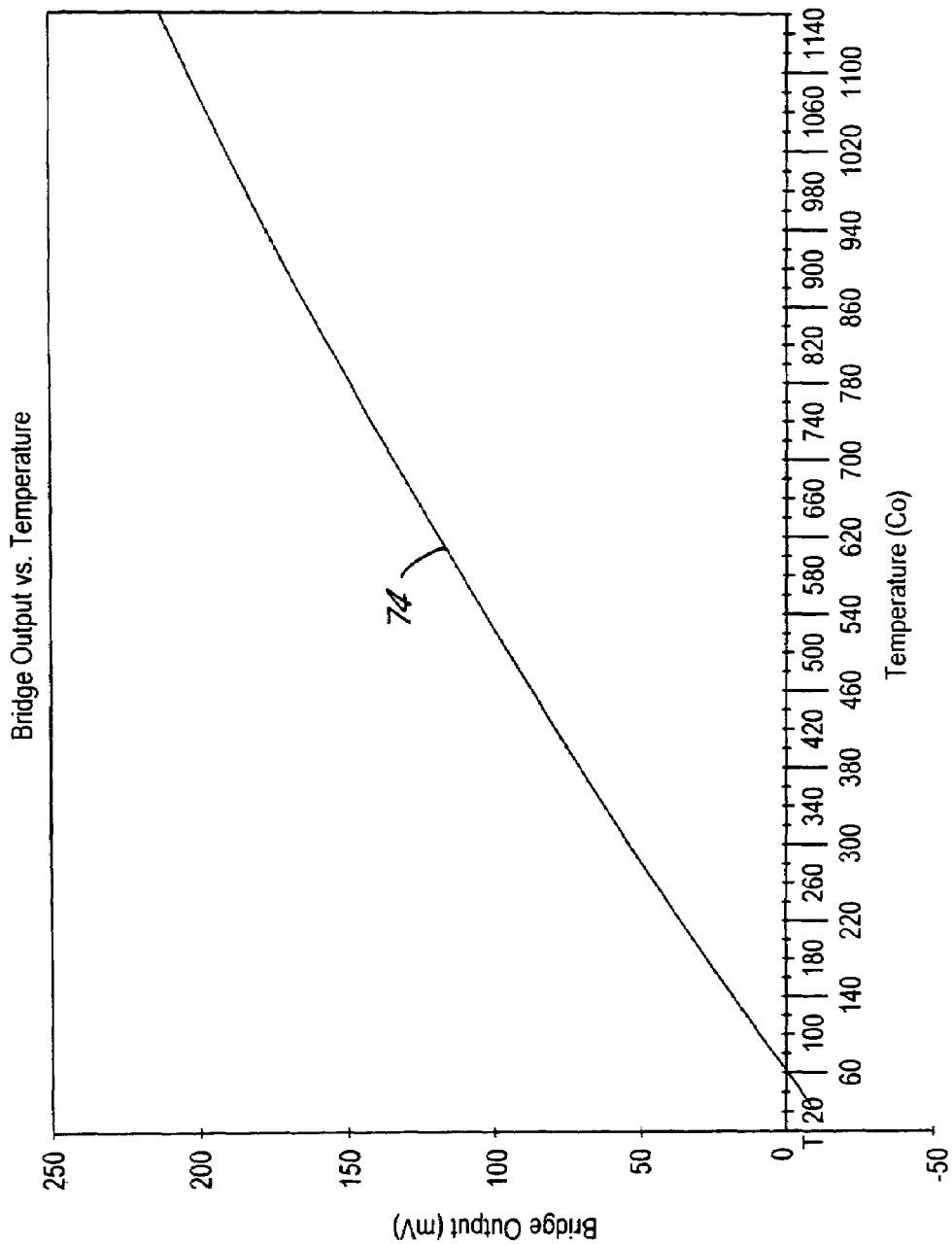
FIG. 4 is a signal schematic showing a voltage utilized to control a heating coil in the exhaust gas sensor of FIG. 1.

Referring to FIG. 4, a graph containing a representative plot 74 showing a correlation of bridge output voltage versus a heater temperature is provided.

Figure 5:
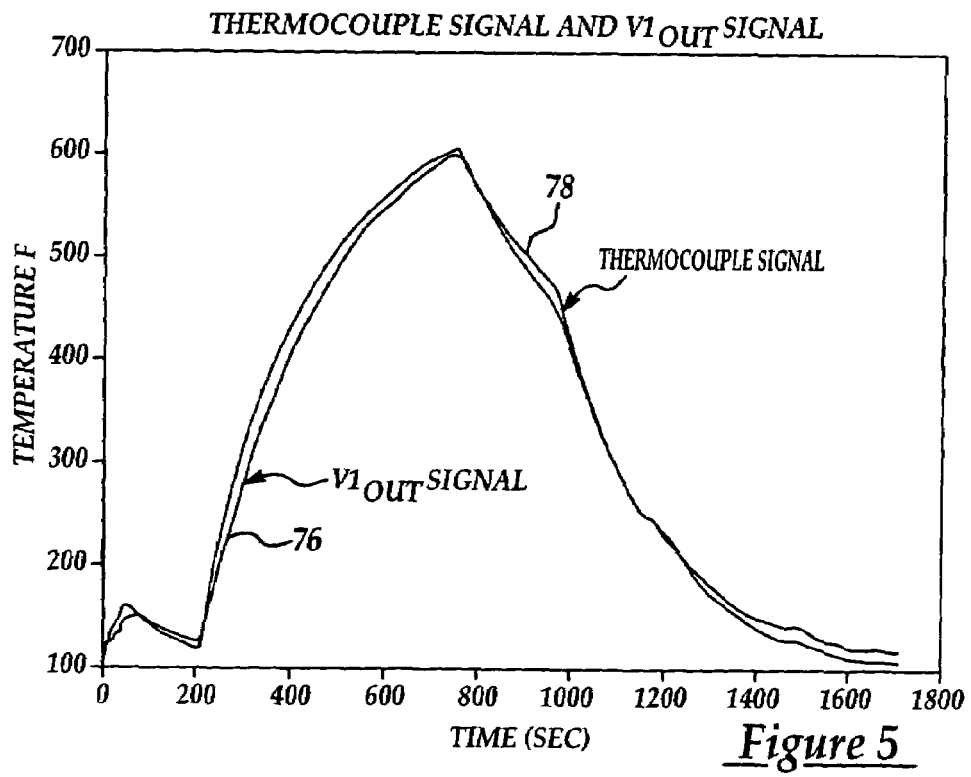
FIG. 5 is a signal schematic showing the close correlation between a temperature measured by the exhaust gas sensor and a temperature measured by a thermocouple.

Referring to FIG. 5, a signal schematic is provided that illustrates the close correlation between a temperature measured by the exhaust gas sensor and a temperature measured by a conventional thermocouple. In particular, signal trace 76 represents a signal generated by a bridge circuit such as one of the two bridge circuits shown in FIG. 3. Signal trace 78 represents a signal generated by a thermocouple. Comparison of signal traces 76, 78 shows that the temperature measurement obtained in accordance with principles of the present invention closely correlates with a thermocouple measurement.

The inventive system and method provides a substantial advantage over known systems and method. In particular, the system and method utilizes a conventional exhaust gas sensor to measure a temperature of engine exhaust gases. Thus, a separate temperature sensor, as used in known in conventional exhaust systems, would not be needed which results in decreased component and manufacturing costs.

We claim:

1. A system for determining a temperature of exhaust gases from an engine, comprising
    an exhaust gas sensor having an electric heating coil, said sensor communicating with the exhaust gases;
    an electrical circuit for generating a signal indicative of the resistance of said heating coil when said coil is de-energized;
    a controller receiving said signal and calculating said temperature of said exhaust gases based on said signal, where the controller generates a duty cycle to successively energize and de-energize said coil, and where the controller calculates said temperature during a plurality of successive de-energized periods of the duty cycle, the heater being operated to heat the sensor when it is below its desired operating temperature; and
    a switching circuit for coupling the electrical circuit to the electric heating coil during said de-energizing of the coil, and uncoupling the electric circuit from the electric heating coil during said energizing of the coil.

2. The system of claim 1 wherein said electrical circuit comprises a Wheatstone bridge circuit operatively coupled to said exhaust gas sensor.

3. The system of claim 1 where the electrical circuit includes a measuring resistance.

4. A method for determining a temperature of exhaust gases from an engine, comprising:
    generating a duty cycle to successively energize and de-energize a heating coil in an exhaust gas sensor, the heater being operated to heat the sensor when it is below its desired operating temperature, and where the heating coil is coupled in series with a measuring resistance circuit during said de-energizing, and the heating coil uncoupled with the measuring resistance circuit during said energizing;
    generating a signal indicative of a resistance of said heating coil during a plurality of successive de-energized periods of the duty cycle; and
    calculating a temperature of the exhaust gases based on said signal.

5. A system for determining a temperature difference of exhaust gases from an engine, the engine being coupled to an emission catalyst, the system comprising:
    a first exhaust gas sensor having a first electric heating coil, said first sensor communicating with exhaust gases upstream of the catalyst;
    a second exhaust gas sensor having a second electric heating coil, said second sensor communicating exhaust gases downstream of the catalyst;
    a first electrical circuit generating a first signal indicative of a resistance of said first heating coil when said first coil is not energized;
    a second electrical circuit generating a second signal indicative of the resistance of said second heating coil when said second coil is not energized;
    a controller calculating a temperature difference between exhaust gases communicating with said first and second exhaust gas sensors based on said first and second signals, where the controller generates respective duty cycles to successively energize and de-energize said respective coils, and where the controller calculates said temperatures during a plurality of respective successive de-energized periods of the duty cycles; and
    a switching circuit for coupling one of the first and second electrical circuits to one of the first and second electric heating coils during de-energizing, and uncoupling the one of the first and second electric circuits from the one of the first and second electric heating coils during energizing of the coil.

6. A system for determining a temperature difference of exhaust gases form an engine, the engine being coupled to an emission catalyst, the system comprising:
    a first exhaust gas sensor having a first electric heating coil, said first sensor communicating with exhaust gases upstream of the catalyst;
    a second exhaust gas sensor having a second electric heating coil, said second sensor communicating exhaust gases downstream of the catalyst;
    an electrical circuit coupled to both the first and second electric heating coil, the circuit generating a first signal based on both a resistance of said first sensor heating coil and a resistance of said second sensor heating coil;
    a controller calculating a temperature difference between exhaust gases communicating with said first and second exhaust gas sensors based on said first signal; and
    a switching circuit for coupling one of the first and second electrical circuits to one of the first and second electric heating coils during de-energizing, and uncoupling the one of the first and second electric circuits from the one of the first and second electric heating coils during energizing of the coil.

* * * * *